US006588556B2

(12) United States Patent
Strobel et al.

(10) Patent No.: US 6,588,556 B2
(45) Date of Patent: Jul. 8, 2003

(54) PRESSURE MEDIUM CYLINDER WITH ATTACHED FUNCTION BLOCK

(75) Inventors: Georg Strobel, Obertraubling (DE); Josef Düunzinger, Alteglofsheim (DE)

(73) Assignee: Hoerbiger Micro Fluid GmbH, Barbing-Regensburg (DE)

( * ) Notice: Subject to any disclaimer, the term of this patent is extended or adjusted under 35 U.S.C. 154(b) by 0 days.

(21) Appl. No.: 09/911,858

(22) Filed: Jul. 25, 2001

(65) Prior Publication Data

US 2002/0010978 A1 Jan. 31, 2002

(30) Foreign Application Priority Data

Jul. 26, 2000 (AT) ............................................. 1315/00

(51) Int. Cl.[7] ................................................. F16B 15/14

(52) U.S. Cl. ..................... 188/314; 92/142; 188/322.17

(58) Field of Search ................................ 188/314, 315, 188/298, 322.19, 322.17, 322.13, 266; 267/64.11–64.78; 137/884, 625, 596, 886; 91/408; 92/128, 161, 169.1; 251/367; 285/18, 45; 138/30, 31, 26, 89, 103

(56) References Cited

U.S. PATENT DOCUMENTS

| | | | | | |
|---|---|---|---|---|---|
| 3,782,689 | A | * | 1/1974 | Barosko | |
| 4,050,684 | A | * | 9/1977 | Sanders | 188/314 |
| 4,335,645 | A | * | 6/1982 | Leonard | 91/51 |
| 4,414,881 | A | | 11/1983 | Devaud | |
| 4,469,010 | A | * | 9/1984 | Skover, Jr. et al. | 188/314 |
| 5,020,418 | A | * | 6/1991 | Sendoykas | |
| 5,117,741 | A | | 6/1992 | Richards | |
| 5,937,647 | A | * | 8/1999 | Hung | |
| 5,975,967 | A | | 11/1999 | Nishi | |
| 6,105,740 | A | * | 8/2000 | Marzocchi et al. | 188/314 |
| 6,209,580 | B1 | * | 4/2001 | Foster | |

FOREIGN PATENT DOCUMENTS

| | | | |
|---|---|---|---|
| AT | 40 9788 B | * | 11/2002 |
| BE | 1011346 | | 7/1999 |
| DE | 2336249 | * | 2/1975 |
| EP | 1176319 | * | 6/2001 |
| JP | 1-247810 | * | 10/1989 |
| JP | 2001-304205 | * | 10/2001 |
| WO | 9934119 | | 7/1999 |

OTHER PUBLICATIONS

Knapp Micro Fuid brochure, Hydraulische Zylinder–Speichereinheit LE, Dec. 1992.

* cited by examiner

*Primary Examiner*—Douglas C. Butler
(74) *Attorney, Agent, or Firm*—Dykema Gossett PLLC

(57) ABSTRACT

A pressure medium cylinder with a piston rod (1) extending out on one side has a cylinder floor (3), which closes off the cylinder tube (2) on the piston side with a fastening element (4), and a function block (5), placed upon the former, with function elements (6 to 9). In order to improve the connection between cylinder floor (3) and function block (5), the cylinder floor (3) has at least one cylindrical outer connection area (17) into which the pressure medium lines (19, 20) that lead to the work chambers (11, 18) open to the outside and onto which the function block (5) is placed and attached with a sealed through-hole (21), into which the pressure medium lines of the function elements (5 to 9) open.

8 Claims, 2 Drawing Sheets

PRESSURE MEDIUM CYLINDER WITH ATTACHED FUNCTION BLOCK

BACKGROUND OF THE INVENTION

1. Field of the Invention

The invention relates to a pressure medium cylinder with a piston rod extending out on one side whose cylinder floor, which closes off the cylinder tube on the piston side, carries a fastening element and a function block, placed on top, with function elements, for example, hook-ups, valves, and a pressure tank or accumulator.

2. The Prior Art

Cylinders of this type have been known in the art for different kinds of applications. Despite simple and compact construction, they allow for safe functioning and provide strokes and forces that are variable within wide margins. In particular with respect to safety engineering applications, it is often desired or necessary that at least some function elements for controlling these types of cylinders are arranged directly on the cylinder itself and without being obstructed by lines, which represent an increased risk. Aside from the fact that arranging these types of function elements in one piece with or as part of the cylinder floor, cylinder lid or cylinder tube, complicates the overall design and, by its nature, assembly and maintenance as well, those types of apparatuses have proved effective in this context which feature block-type combined function units that are placed on or inside the area of the cylinder floor. Therefore, these function blocks are screwed on, while sealed, to connection surfaces that are to be worked correspondingly. The necessary pressure medium connections are established via matching openings of the corresponding lines on the connection areas acting in conjunction.

Pressure medium cylinders of this type are used, for example, in so-called cylinder storage units which are found in the context of passenger protection and/or passenger (occupant) restraint applications in vehicles used in amusement rides, etc., in connection with safety grippers (lap bars) or similar elements. In contrast to mechanical locking systems currently in use, these pressure storage units make it possible to realize a continuous gripper adjustment. The wear and tear involved is negligible in comparison to mechanical systems, a fact that also contributes to an improvement of the safety function. The safety gripper is opened via the energy that was stored during the closing process in a pressure tank on the function block. To improve the safety function it is also possible to use several units per person.

A certain disadvantage still remains with the embodiments of pressure medium cylinders of the type that are known in the art and that were described at the outset. Specifically, despite all of their advantages, these cylinders are equipped with a relatively complicated and inflexibly realized connection of the function block. There appears to be potential for improvement on the connection of the function block in terms of its construction volume, the weight of the overall apparatus and safety and/or solidity of the connection.

It is the object of the present invention to provide an improved pressure medium cylinder of the type described earlier in order to avoid the referred to disadvantages of the apparatuses that are known in the art and in order to improve the apparatus and the attachment of the function block placed upon it.

SUMMARY OF THE INVENTION

The objective that has been outlined here is achieved with a pressure medium cylinder of the type referred to at the outset according to the invention in particular in such a manner that the cylinder floor has at least one cylindrical outer connection area in which the pressure medium lines, leading to the work chambers, open to the outside and upon which the function block is placed and fastened utilizing a sealed through-hole into which the pressure medium lines of the function elements open. Consequently, the connection area that was envisioned until now always only on one side on the cylinder or the cylinder floor has been expanded to a revolving, cylindrical outer connection area on the cylinder floor, which is inserted into a correspondingly sealed through-hole of the function block and fastened there. Thus, this results in a very stable and therefore secure construction. Any forces that may develop between the cylinder or the cylinder floor and the function block are thus transferred for the most part directly, form-fittedly between these structural components and not, as it has been customary to date, via hold down bolts or similar elements on the one-sided connection areas.

According to a particularly preferred further embodiment of the invention, it is envisioned that, in total, the cylinder floor is realized as a coaxial, connected-sealed, separate turned part with the cylinder tube, which in turn considerably simplifies the manufacture of the cylinder floor in contrast to the milled part required until now.

The pressure medium lines in the through-hole of the function block and /or on the outer connection area of the cylinder floor open, according to another preferred embodiment, into revolving ring recesses thereby resulting very simply in a certain freedom in terms of the angle when positioning the function block in relation to the cylinder floor or the pressure medium cylinder. If the fastening element on the cylinder floor determines, for example, a defined turning position of the cylinder, with this embodiment, however, it is still possible to fasten the function block turned at any angle in relation thereto on the cylindrical connection area of the cylinder floor, which is advantageous for many applications.

In another embodiment of the invention the cylinder floor is screwed and sealed into the cylinder tube, thereby simplifying manufacture and assembly, which does not result in any difficulties with regard to positioning the parts in relation to one another, ultimately because of the possibility described above of mounting the function block offset in terms of its angle.

According to another preferred embodiment of the invention, the fastening element for the pressure medium cylinder is attached on the outer side of the cylinder floor and consists preferably of a screwed in swivel eye. This too simplifies manufacture and assembly of the cylinder floor and/or of the overall pressure medium cylinder.

In another advantageous embodiment of the invention it can be envisioned that the function block that is placed on [the apparatus] is fastened by way of a fastening nut that is screwed on to the cylinder floor from the outside. This way, very simply, a possibility for safely attaching the function block is created, while the option that was addressed above for installing a, for example, larger swivel eye at a later date is not impaired by this.

The invention will now be described in more detail by reference to the attached drawings.

DETAILED DESCRIPTION OF THE PREFERRED EMBODIMENTS

Figure 1:
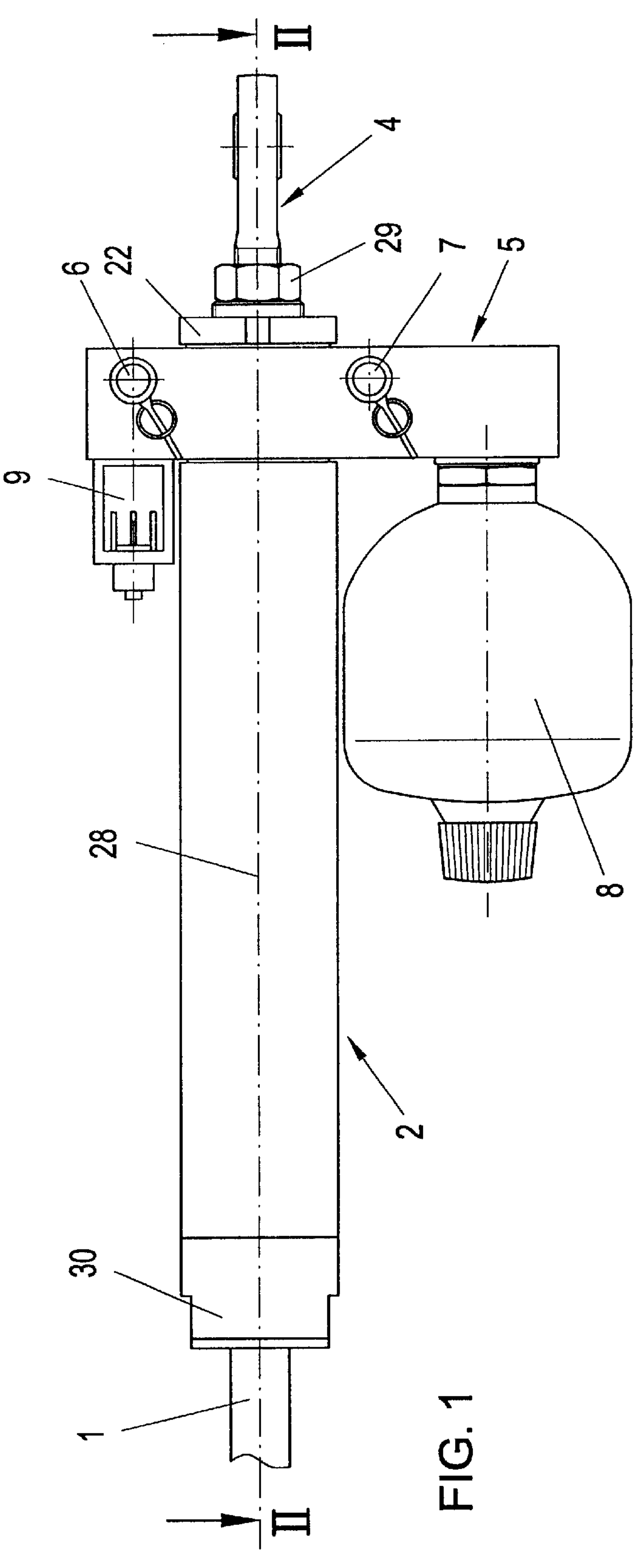
FIG. 1 shows a partial top view of a pressure medium cylinder constructed in accordance with a preferred embodiment of the present invention.
Figure 2:
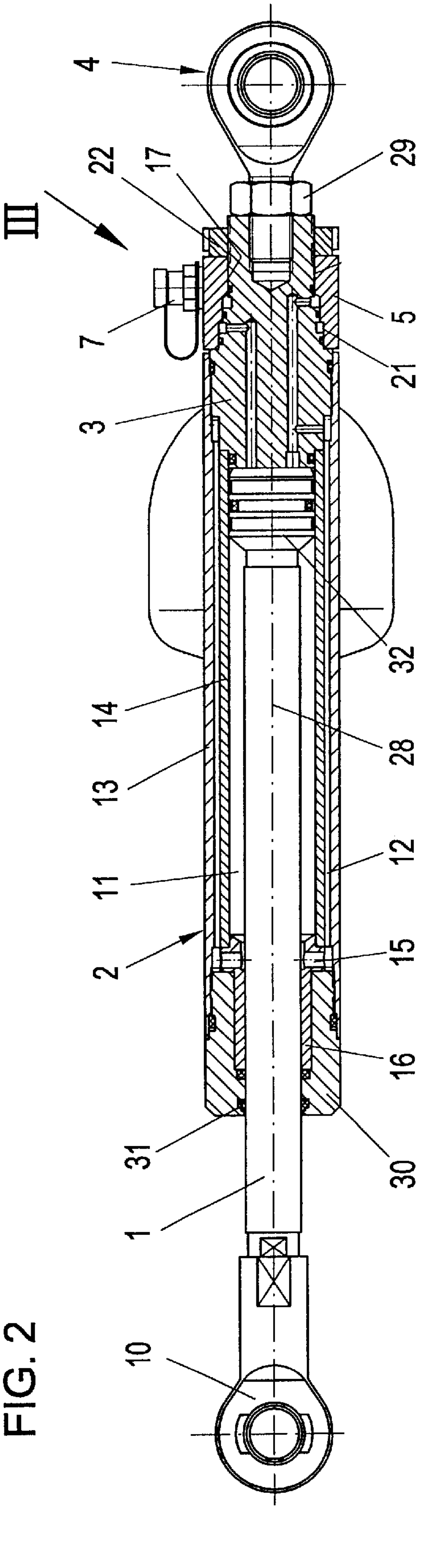
FIG. 2 is a section along the line II—II in FIG. 1 on a smaller scale.
Figure 3:
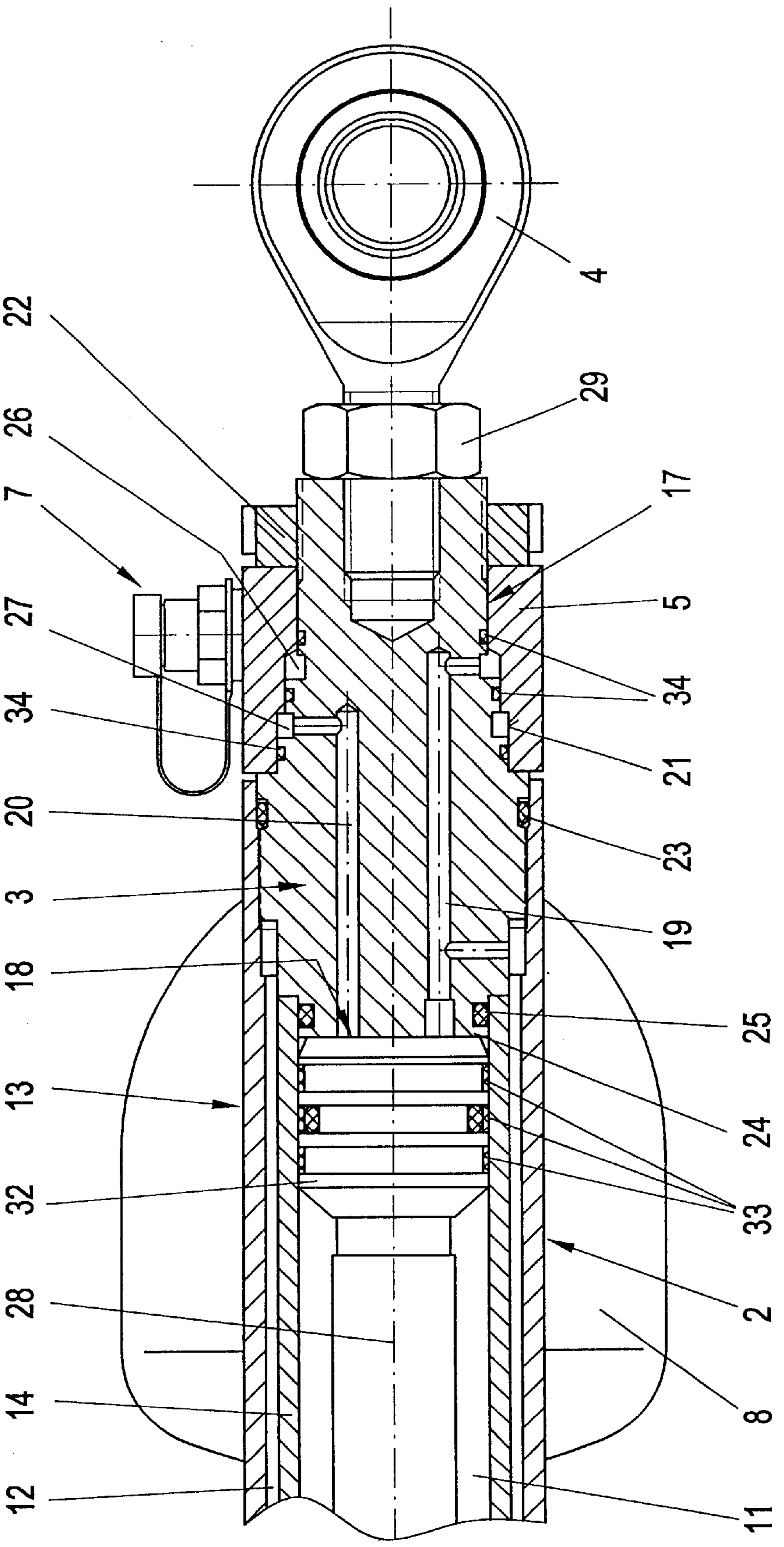
FIG. 3 shows the detail III from FIG. 2 on a larger scale.

FIG. 1 shows a linear pressure medium cylinder with a piston rod 1 that extends out on one side, whose cylinder floor 3, which closes off the cylinder tube 2 on the piston side, carries a fastening element 4 and a function block 5, placed onto it, with function elements, for example connections 6, 7, a pressure storage tank 8, and a valve 9. Pressure medium cylinders of this type are used, for example, in the field of passenger protection or passenger retention in vehicles, etc., for activating or holding safety grippers or similar elements. The safety gripper, which is controlled via the piston rod 1 or the eye 10 attached thereto, is opened (not shown in here) via the energy that has been stored in the pressure storage tank on the function block 5 during the closing procedure (when the piston rod is driven in).

Aside from the above, pressure medium cylinders—with the most varied function elements in or on the function block—are also advantageous to use for a variety of other applications, for example as work cylinders for operating apparatus or machine elements, whereby, due to the fact that the function block is arranged directly on the pressure medium cylinder, protection against leakage or line breaks is improved. In the embodiment that is shown, the work chamber 11 on the rod side is, moreover, supplied with pressure medium without the need to guide pressure medium lines separately outside. A concentric hollow space 12 between outer tube 13 and inner tube 14 of the cylinder tube 2 is used for this purpose. The latter can, as will be addressed below, be admitted or discharged via the pressure medium lines in the function block 5, on the one hand, and via the bore holes 15, on the other hand, in a guide element 16 that is on the lid-side. The result is an overall very compact apparatus that manages to get along without outer pressure medium lines in the area of the pressure medium cylinder itself, thereby satisfying the strictest safety requirements.

To make the connection of the function block 5 with the pressure medium cylinder or the cylinder floor 3 simpler and more stable, the cylinder floor 3 has a gradual cylindrical outer connection area 17 to which open to the outside the pressure medium lines 19, 20 that lead to the work chambers 11 (rod-side) and 18 (piston-side); and the function block 5 with a sealed through-hole 21, into which the pressure medium lines of the function elements 6 and 9 open, not shown in more detail, is placed onto the connection area and fastened by way of a union nut 22. The total cylinder floor 3 is realized as a turned part that is coaxial, separate in relation to the cylinder tube 2, sealed by way of a ring seal 23 and screwed into the outer tube 13 of the cylinder tube 2, and which carries on a front shoulder 24, sealed via another ring seal 25, the inside tube 14 as well.

The pressure medium lines 19 and 20 as well as those pressure medium lines not shown here coming from the function elements 6 to 9 in the function block 5 open in between the through-hole 21 of the function block 5 and the revolving ring recesses 26, 27 realized in connection area 17 of the cylinder floor 3. This way the function block 5 with the function elements 6 to 9 can be swiveled at an angle in relation to the cylinder tube 2 and the screwed in cylinder floor 3 around the axis 28 of the overall pressure medium cylinder, thereby allowing simple adjustments to accommodate for the respective installation situation of the pressure medium cylinder. The fastening element 4 is realized as a screwed in swivel eye and fastened with a lock nut 29. Because the diameter of the swivel eye is larger here, before the swivel eye is screwed on, the union nut 22 must at least already be in place and ready to fasten or fix the function block 5 to the cylinder floor 3—but an adjustment at an angle of the function block 5 followed by fastening action due to tightening of the union nut 22 is also possible when the fastening element 4 is screwed in and fastened.

The cylinder lid 30 with seal 31, on the one hand, carrying the previously referred to guide element 16 on the inside and, on the other hand, the sealed outer tube 13 on the outside (the inner tube 14 is resting on a projection of the guide element 16) needs to be mentioned here only for reasons of completeness.

The same applies for the special realization of the piston 32 with three grooves for sealing or guide rings 33.

Aside from the shown graduated realization of the connection area 17 and the through-hole 21 with sealing rings 34, envisioned for the lateral sealing of the ring recesses 26, 27, it is also possible, if need be, to envision another suitable realization of the connection surfaces acting in conjunction; other realizations of the openings of the pressure medium lines (diagonal or lateral side of a projection or groove) would be possible as well. Also, the fastening element 4 can also, if necessary, be realized as one piece with the cylinder floor 3, or it is possible to select another method for fastening the function block 5 to the cylinder floor 3.

What is claimed is:

1. A pressure cylinder assembly which comprises:

a cylinder tube which defines first and second ends, a piston which is movable within said cylinder tube and includes a rod which extends out of said first end of said cylinder tube, said piston defining on opposite sides thereof a piston chamber and a rod chamber in said cylinder tube, a cylindrical floor member positioned in said second end of said cylinder tube to close said second end, said cylindrical floor member including a cylindrical outer connection portion and providing first and second channels therethrough for respectively conveying pressure medium between an outer surface of said cylindrical outer connection portion and said piston and said rod chambers, a fastening element extending from said cylindrical outer connection portion, and a function block attached to said cylindrical outer connection position, said function block including function elements and a through-hole for communicating pressure lines therein with said first and second channels in said cylindrical outer connection member.

2. A pressure cylinder assembly according to claim 1, including seal means between said cylindrical floor member and said cylinder tube.

3. A pressure cylinder assembly according to claim 1, wherein said cylindrical floor member includes circumferential recesses where said first and second channels communicate with said outer surface of said cylindrical outer connection portion.

4. A pressure cylinder assembly according to claim 1, wherein the cylindrical floor member is threadingly engaged with said cylinder tube.

5. A pressure cylinder assembly according to claim 1, wherein said fastening element comprises a swivel eye which is threadingly engaged with said cylindrical outer connection portion.

6. A pressure cylinder assembly according to claim 1, including lock nut which is threadingly engaged with said cylindrical outer connection portion to lock said function block in position.

7. A pressure cylinder assembly according to claim 1, wherein said function elements include at least one of a container for pressure medium a valve and line connectors.

8. A pressure cylinder assembly according to claim 1, wherein said cylinder tube comprises an outer cylinder and an inner cylinder, said outer and inner cylinders defining an annular passageway therebetween which communicates with said rod chamber.

* * * * *